US010619508B2

(12) United States Patent
King et al.

(10) Patent No.: US 10,619,508 B2
(45) Date of Patent: Apr. 14, 2020

(54) VARIABLE TURBINE GEOMETRY VANE LEVER

(71) Applicant: BorgWarner Inc., Auburn Hills, MI (US)

(72) Inventors: Matthew King, Mars Hill, NC (US); Josh Norsworthy, Asheville, NC (US); Eli Morgan, Leicester, NC (US)

(73) Assignee: BorgWarner, Inc., Auburn Hills, MI (US)

( * ) Notice: Subject to any disclaimer, the term of this patent is extended or adjusted under 35 U.S.C. 154(b) by 193 days.

(21) Appl. No.: 15/803,363

(22) Filed: Nov. 3, 2017

(65) Prior Publication Data

US 2019/0136709 A1     May 9, 2019

(51) Int. Cl.
| | |
|---|---|
| *F01D 17/16* | (2006.01) |
| *F01D 9/04* | (2006.01) |
| *F02C 6/12* | (2006.01) |
| *F02B 37/24* | (2006.01) |

(52) U.S. Cl.
CPC .............. *F01D 17/16* (2013.01); *F01D 9/041* (2013.01); *F01D 17/165* (2013.01); *F02B 37/24* (2013.01); *F02C 6/12* (2013.01); *F05D 2220/40* (2013.01); *F05D 2240/12* (2013.01); *F05D 2260/50* (2013.01)

(58) Field of Classification Search
CPC .................................................... F01D 17/165
See application file for complete search history.

(56) References Cited

U.S. PATENT DOCUMENTS

| | | | |
|---|---|---|---|
| 8,186,944 B2 | 5/2012 | Tries et al. | |
| 9,388,708 B2 | 7/2016 | Heidingsfelder et al. | |
| 2008/0031728 A1 | 2/2008 | Sausse et al. | |
| 2012/0243973 A1* | 9/2012 | Kierat | F01D 17/165 |
| | | | 415/148 |
| 2012/0315164 A1 | 12/2012 | Mayernick et al. | |
| 2015/0118028 A1 | 4/2015 | Metz et al. | |
| 2015/0132112 A1* | 5/2015 | Metz | F01D 17/165 |
| | | | 415/159 |
| 2016/0010542 A1* | 1/2016 | Metz | F01D 17/165 |
| | | | 60/605.1 |
| 2017/0081975 A1* | 3/2017 | Zagone | F01D 9/041 |

* cited by examiner

*Primary Examiner* — Woody A Lee, Jr.
(74) *Attorney, Agent, or Firm* — Young Basile Hanlon & MacFarlane, P.C.

(57) ABSTRACT

A variable turbine geometry assembly is provided for controlling flow of exhaust gas to a turbine wheel of a turbocharger. The variable turbine geometry assembly includes a base structure, vanes, vane levers, and an adjustment ring. The vanes are distributed circumferentially around the base structure and are pivotable relative to the base structure to vary an effective inlet area. The vane levers are for pivoting the vanes. The vane levers each include an inner portion coupled to one of the vanes and an outer portion extending from the inner portion. The adjustment ring is selectively rotatable about a central axis to pivot the vanes. The adjustment ring includes apertures that are each associated with and have received therein the outer portion of one of the vane levers. The outer portion of each of the vane levers includes an outer surface that is non-parallel with the central axis.

20 Claims, 9 Drawing Sheets

VARIABLE TURBINE GEOMETRY VANE LEVER

TECHNICAL FIELD

This disclosure relates to turbochargers, and more particularly, turbochargers that include variable turbine geometry assemblies.

BACKGROUND

Turbochargers are forced-induction devices that are utilized to increase the pressure of the intake air provided to the engine. A turbocharger may be driven by exhaust from the engine. More particularly, exhaust gas from the engine is routed to the turbocharger and to rotate a turbine wheel, which in turn rotates a compressor wheel. The compressor wheel, thereby, pressurizes and supplies intake air to the engine, which may increase the power output of the engine as compared to an otherwise comparable naturally-aspirated engine. The pressure of the air supplied to the engine may be referred to as a boost pressure.

An amount of exhaust gas routed to the turbocharger may vary based on the speed of the engine (e.g., revolutions per minute or RPM). For example, a lower RPM value will result in less exhaust gas than a higher RPM value. Exhaust gas flowing through a fixed inlet area will, thus, have a lower flow velocity with lower engine speed and a higher flow velocity with higher engine speed. As a result, the lower flow velocity of the exhaust will result in a lower turbine speed and the higher flow velocity will result in a higher turbine speed. The lower and higher turbine speeds, respectively, result in lower and higher boost pressure from the compressor wheel.

To control boost pressure over a range of engine speeds, turbochargers may include variable turbine geometry (VTG) assembly, which varies an effective inlet area to the turbine wheel. The VTG assembly includes a plurality of vanes circumferentially distributed around the turbine wheel. The vanes are selectively rotated in order to change an effective geometry of the turbine housing and, in particular, change the effective inlet area. For example, at low engine speed, the vanes may be rotated to a more closed position, which reduces the inlet area, so as to increase velocity of the exhaust gas flowing to the turbine wheel. Conversely, at high engine speed, the vanes may be rotated to a more open position, which increases the inlet area, so as to accommodate a greater flow rate of the exhaust gas flowing the turbine wheel. Accordingly, the speed of the turbine wheel and, thereby, the boost of the turbocharger may be controlled over a range of engine speeds.

Each vane may be rotated by a respective vane lever. The vane levers may be rotated in unison, for example, by an adjustment ring that is adapted to be selectively rotatable between a first position and a second position. As the adjustment ring is rotated, portions of the adjustment ring engage each vane lever, which causes the vane levers to move, thereby causing the vanes to rotate. Furthermore, vibratory and other forces applied to the turbocharger may cause the adjustment ring and/or the levers to rattle into each other, which may cause vibrations and/or noise perceptible by the user and/or may cause wear of the adjustment ring and/or vane levers.

SUMMARY

Disclosed herein are aspects, features, elements, implementations, and embodiments of turbochargers that include variable turbine geometry assemblies including vane levers.

In one aspect, a variable turbine geometry assembly is provided for controlling flow of exhaust gas to a turbine wheel of a turbocharger. The variable turbine geometry assembly includes a base structure, vanes, vane levers, and an adjustment ring. The vanes are distributed circumferentially around the base structure and are pivotable relative to the base structure to vary an effective inlet area. The vane levers are for pivoting the vanes. The vane levers each include an inner portion coupled to one of the vanes and an outer portion extending from the inner portion. The adjustment ring is selectively rotatable about a central axis to pivot the vanes. The adjustment ring includes apertures that are each associated with and have received therein the outer portion of one of the vane levers. The outer portion of each of the vane levers includes an outer surface that is non-parallel with the central axis.

In a further aspect, a turbocharger includes a turbine wheel, a turbine housing, and a variable turbine geometry assembly. The turbine housing contains the turbine wheel and includes and inlet and an outlet for exhaust gas to flow, respectively, to and from the turbine wheel. The variable turbine geometry assembly includes a base structure, vanes, vane levers, and an adjustment ring. The vanes are distributed circumferentially around the base structure and are pivotable relative to the base structure to vary an effective inlet area. The vane levers are for pivoting the vanes. The vane levers each include an inner portion coupled to one of the vanes and an outer portion extending from the inner portion. The adjustment ring is selectively rotatable about a central axis to pivot the vanes. The adjustment ring includes apertures that are each associated with and have received therein the outer portion of one of the vane levers. The outer portion of each of the vane levers includes an outer surface that is non-parallel with the central axis.

In a still further aspect, a vane lever is provided for a variable turbine geometry assembly for a turbocharger. The vane lever includes an inner portion and an outer portion. The inner portion is configured to couple to and pivot a vane lever of the variable turbine geometry assembly. The outer portion extends from the inner portion. The outer portion is configured to be received in an aperture of an adjustment ring of the variable turbine geometry assembly and to be engaged by surfaces of the adjustment ring defining the aperture. The outer portion includes an outer surface that extends non-parallel to a pivot axis of the vane lever for the outer portion to have a cross-sectional area that differs at different positions along the pivot axis. The inner portion may extend radially relative to the pivot axis, and the outer portion may include an axial portion that extends from the inner portion axially and that forms the outer surface. The outer surface may be tapered relative to the pivot axis at a constant angle that is non-zero.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are embodiments of turbochargers having variable turbine geometry assemblies that include vane levers that reduce component wear by controlling net radial clearance between the vane levers and an adjustment ring.

Figure 1:
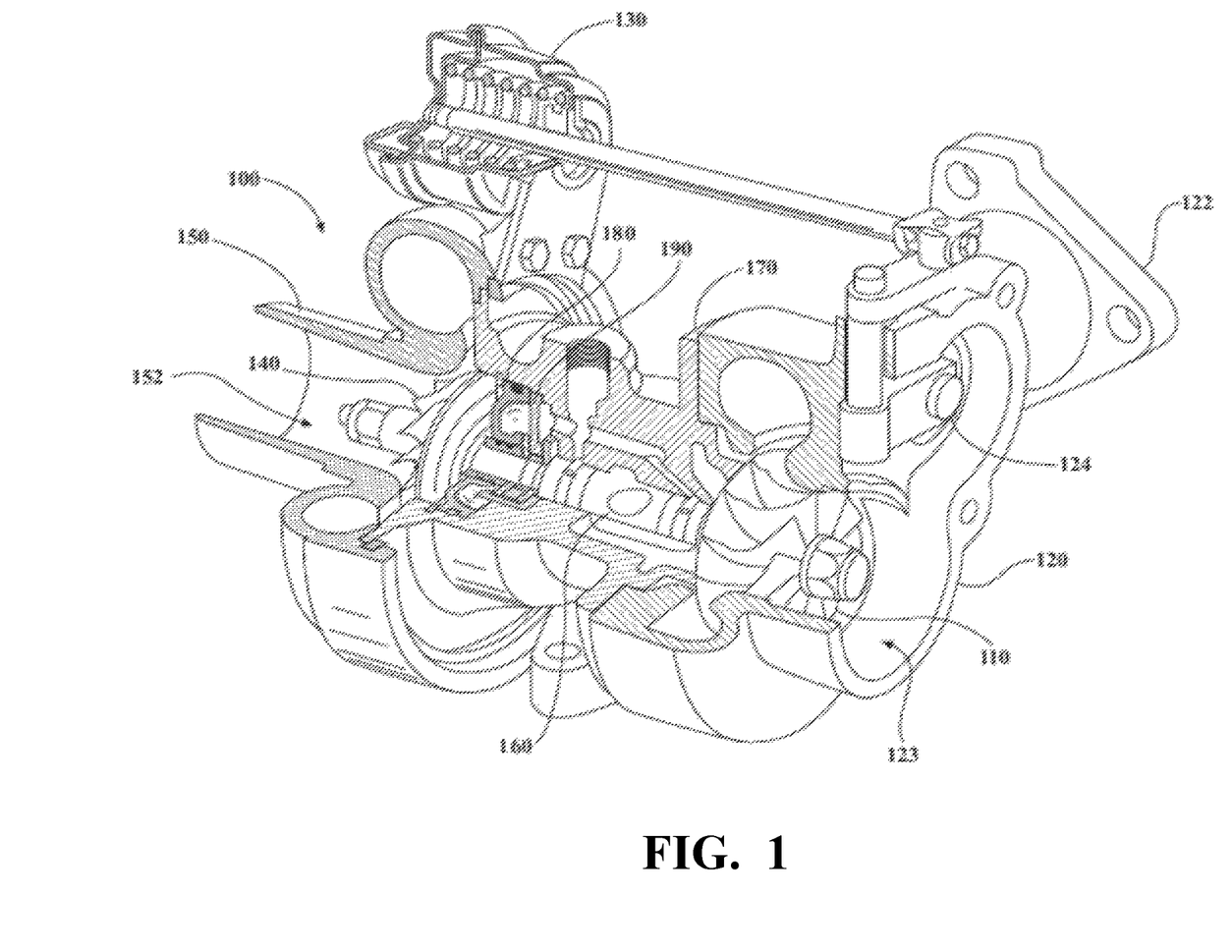
FIG. 1 generally illustrates a perspective partial cross-section view of a turbocharger according to the principles of the present disclosure.
Figure 2:
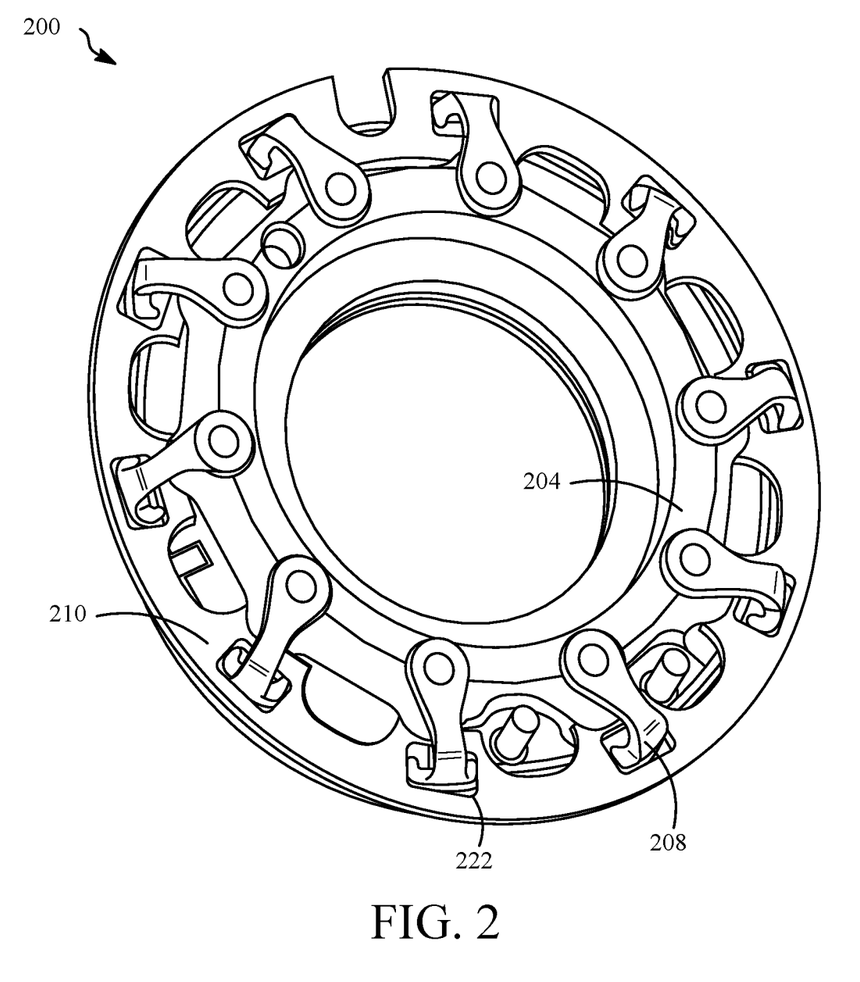
FIG. 2 is a partial, rear perspective view of a variable turbine assembly, which may be used in the turbocharger of FIG. 1 or a variation thereof.
Figure 3A:
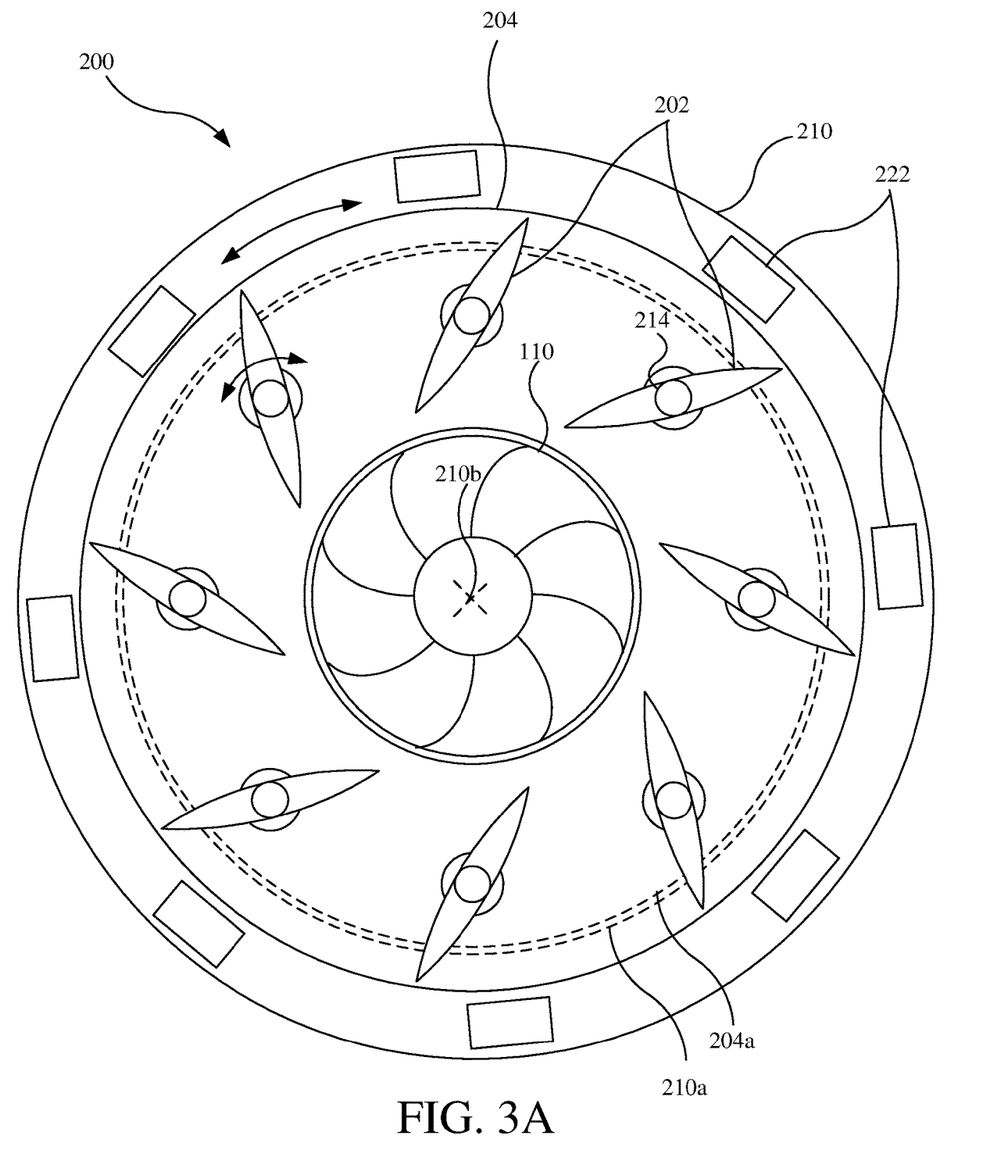
FIG. 3A is a front, partial schematic view of the variable geometry turbine assembly of FIG. 2 in a first configuration.
Figure 3B:
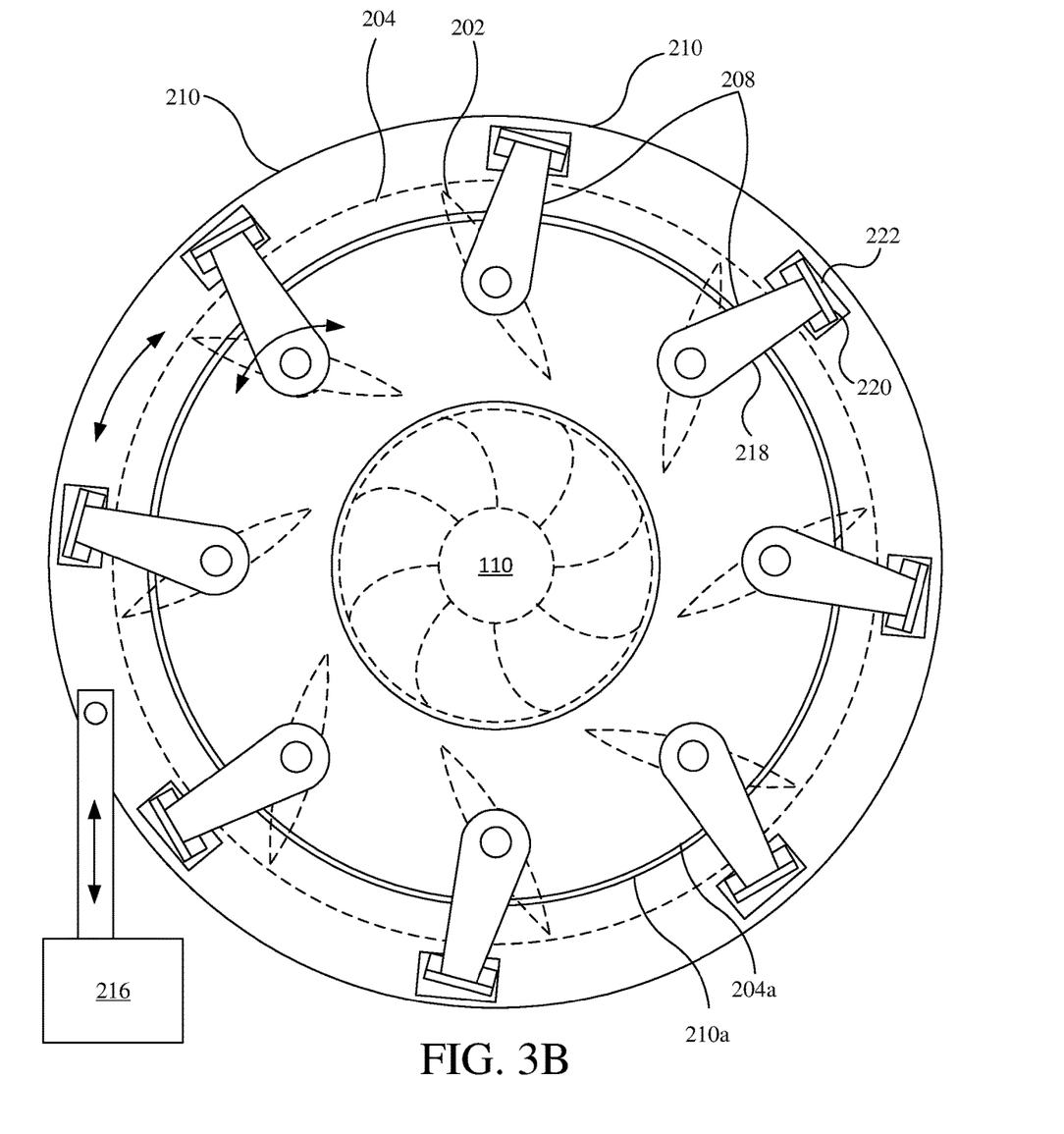
FIG. 3B is a rear, partial schematic view of the variable geometry turbine assembly of FIG. 2 shown in the first configuration.
Figure 4A:
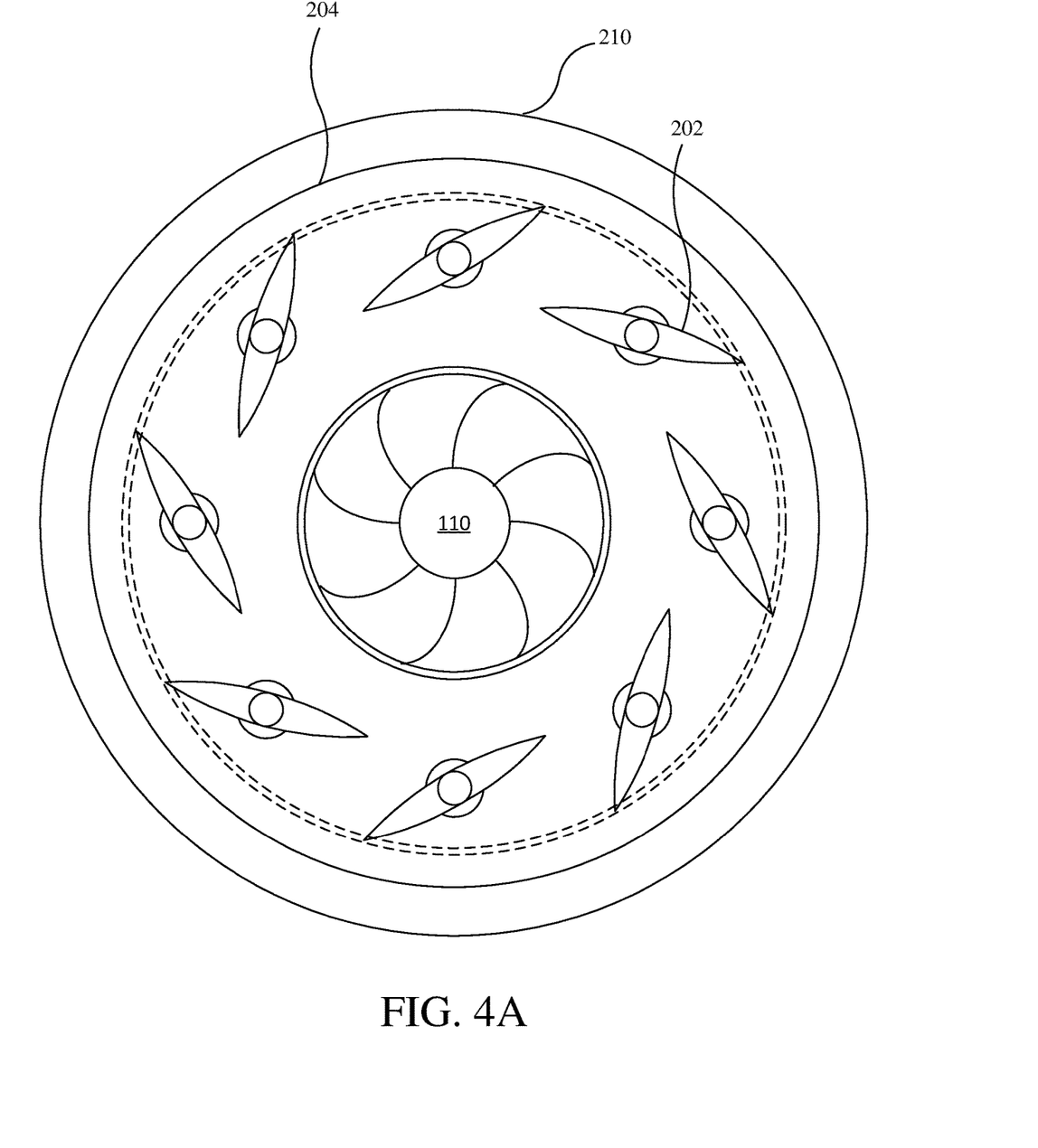
FIG. 4A is a front, partial schematic view of the variable geometry turbine assembly of FIG. 2 in a second configuration.
Figure 4B:
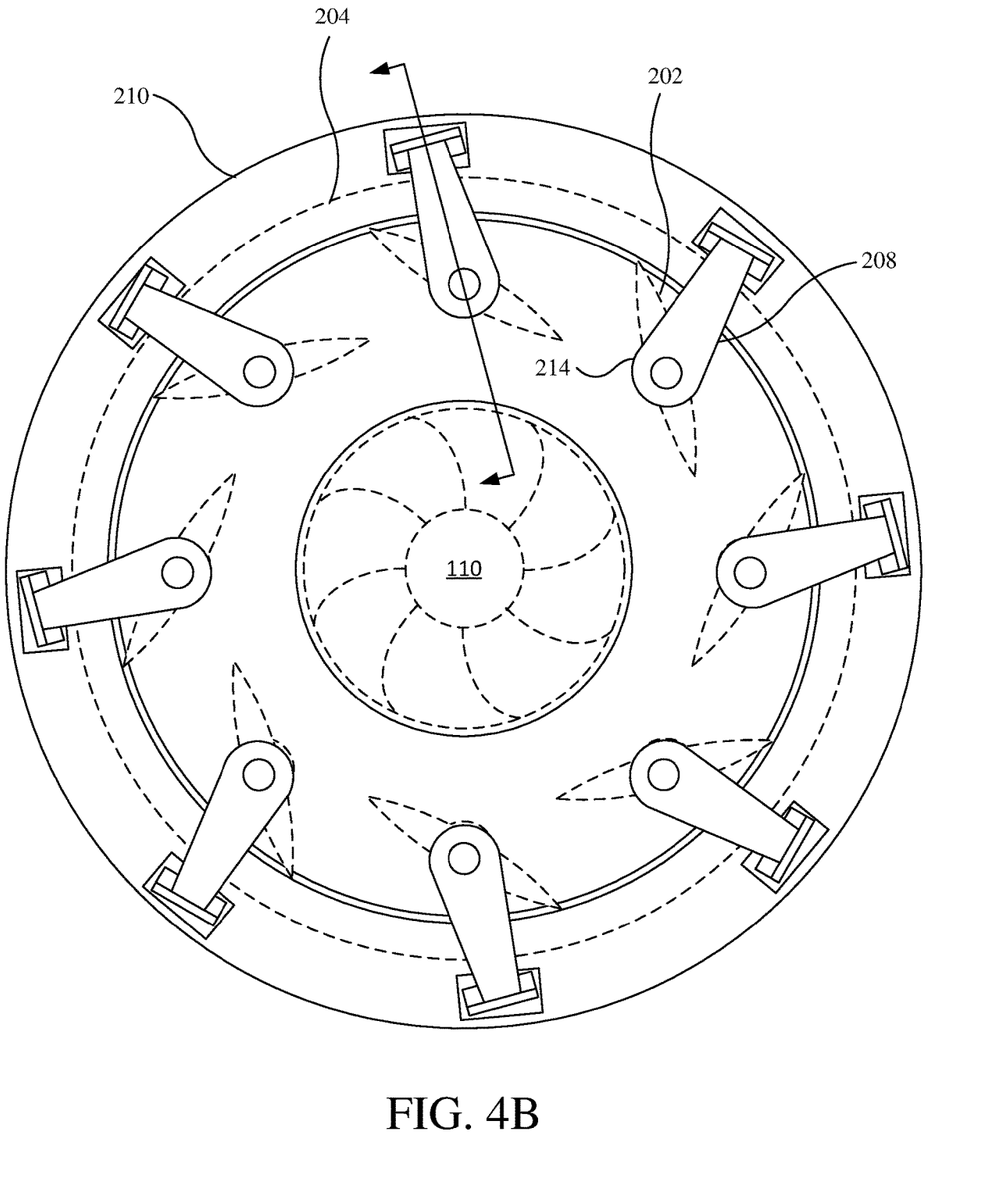
FIG. 4B is a rear, partial schematic view of the variable geometry turbine assembly of FIG. 2 shown in the second configuration.

FIG. 1 shows a turbocharger 100 that is an exhaust-gas driven forced induction device that is utilized in conjunction with an internal combustion engine (not shown). The turbocharger 100 includes a turbine wheel 110 located in a turbine housing 120. The turbine housing 120 includes an exhaust gas inlet 122 for receiving exhaust gas from the internal combustion engine. The inlet extends generally circumferentially around the turbine wheel 110. Exhaust gases are routed from the exhaust gas inlet 122 to the turbine wheel 110 in a radial direction, and away from the turbine wheel 110 to an exhaust gas outlet 123 in an axial direction.

A wastegate valve 124 may be mounted in the turbine housing 120 to allow some or all of the exhaust gas to bypass the turbine wheel 110. For example, the wastegate valve 124 is adapted to divert exhaust gases away from the turbine wheel 110. The diversion of exhaust gases may be used to control turbine velocity, which in turn controls a rotational velocity of the compressor wheel 140. By controlling the rotational velocity of the compressor wheel 140, the wastegate valve 124 can regulate the maximum ambient air pressure in the turbocharger 100. The turbocharger 100 includes an actuator 130. The actuator 130 may include an electric actuator, a mechanical actuator, a pneumatic actuator, a hydraulic actuator, or other suitable actuator. The actuator 130 is adapted to control opening and closing of the wastegate valve 124.

The compressor wheel 140 is located or disposed in a compressor housing 150. The compressor housing 150 includes an intake air inlet 152 and an intake air outlet (not shown). Intake air is routed from the intake air inlet 152 to the compressor wheel 140, where the intake air is pressurized by rotation of the compressor wheel 140. The intake air then exits the compressor housing 150 at the intake air outlet before being supplied to the internal combustion engine.

Rotation of the compressor wheel 140 is driven by rotation of the turbine wheel 110. In particular, the turbine wheel 110 and the compressor wheel 140 are each connected to a shaft 160. The shaft 160 can be a substantially rigid member, and each of the turbine wheel 110 and the compressor wheel 140 can be connected to the shaft 160 in a manner that prevents rotation of the turbine wheel 110 and the compressor wheel 140 with respect to the shaft 160. As a result, the compressor wheel 140 can rotate in unison with the turbine wheel 110 in response to rotation of the turbine wheel 110.

The shaft 160 is supported within a bearing housing 170 such that the shaft 160 can rotate freely with respect to the bearing housing 170 at a very high rotational velocity. The bearing housing 170, the turbine housing 120, and the compressor housing 150 are all arranged along an axis of rotation of the shaft 160. In particular, the bearing housing 170 is positioned between the turbine housing 120 and the compressor housing 150, with a first end of the bearing housing 170 connected to the turbine housing 120 and a second end of the bearing housing 170 connected to the compressor housing 150. The bearing housing 170 can incorporate lubrication and/or cooling features.

The bearing housing 170 defines a cavity, which contains the shaft 160 and a thrust bearing 190. The cavity may be closed by an oil seal plate 180 (e.g., cover, closure, etc.). The shaft 160, the thrust bearing 190, and the oil seal plate 180 function to cooperatively transfer axial force (e.g., axial loading) from the turbine wheel 110 to the bearing housing 170 and, thereby, locate the shaft 160 axially relative to the bearing housing 170.

The turbocharger 100 may further include a variable geometry turbine (VTG) assembly 200, as shown in FIGS. 2-4B. As generally described above, the VTG assembly 200 includes vanes 202 (e.g., eight, as shown, or another suitable number) that are spaced circumferentially around the turbine wheel 110 and which are rotatable to change the effective inlet area through which the exhaust gas flows to the turbine wheel 110 to cause rotation thereof. The VTG assembly 200 is disposed within the turbine housing 120 to control flow of the exhaust gas radially inward from the exhaust gas inlet 122 to the turbine wheel 110.

The VTG assembly 200 generally includes the vanes 202, a base structure 204 (e.g., rearward housing structure), a forward structure 206 (see FIG. 7; e.g., housing structure or forward housing structure), vane levers 208 associated with each of the vanes 202, and an adjustment ring 210. The base structure 204 and the forward structure 206 define an inlet cavity 212 (see FIG. 7) therebetween and through which the exhaust gas flows radially to the turbine wheel 110. The base structure 204 may, for example, be a plate- or disk-like member or other suitable structure. The base structure 204 may, for example, have an inner surface that forms a rear surface of the inlet cavity 212 and that is substantially planar. The forward structure 206 may, for example, be configured as or similar to the turbine housing 120 and is adapted to be spaced apart axially from the base structure 204 to form the inlet cavity 212. The forward structure 206 may, for example, include another inner surface that forms a forward surface of the inlet cavity 212 and that is substantially planar, while also forming the exhaust gas outlet 123 extending axially away from the turbine wheel 110. The forward structure 206 may also be considered as a separate structure, which is coupled to the VTG assembly 200.

Figure 7:
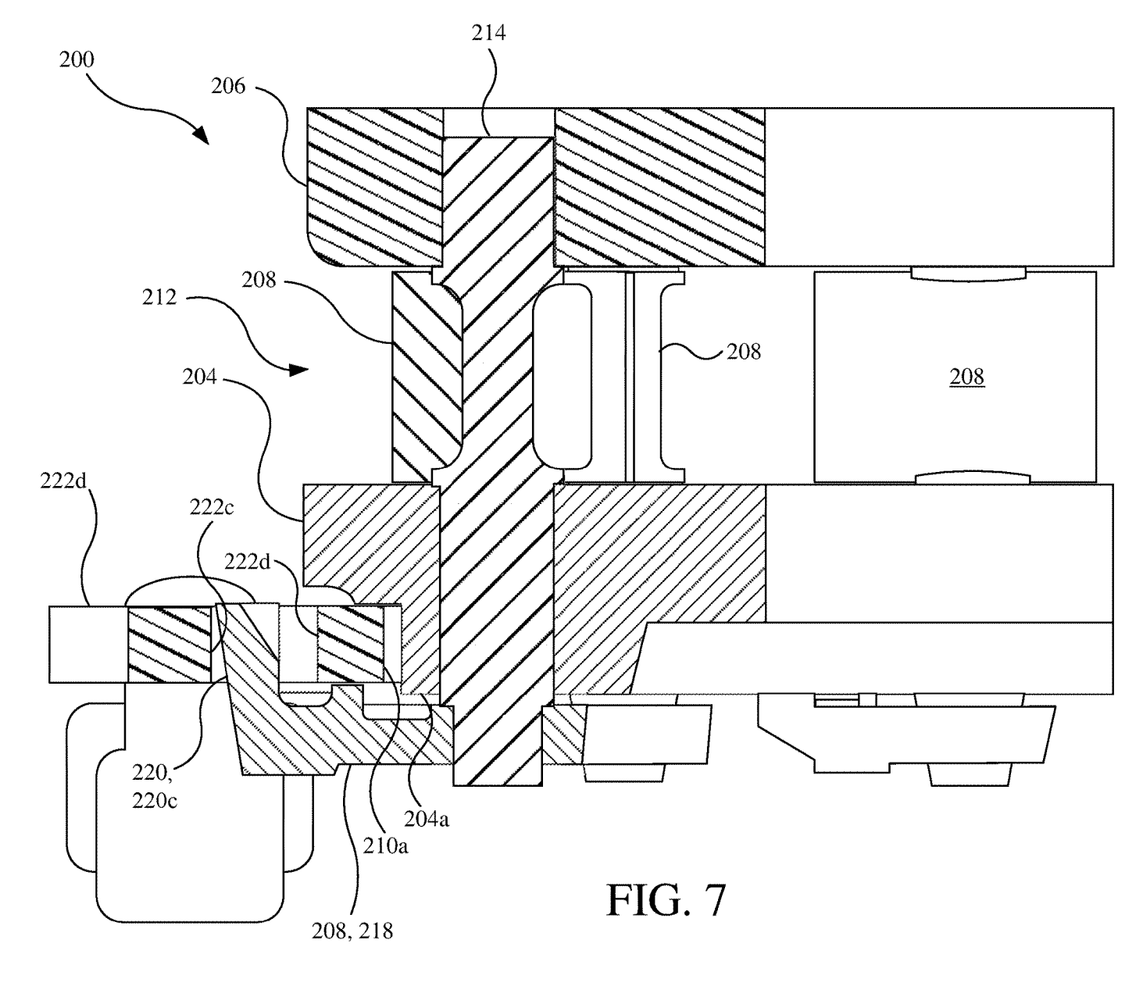
FIG. 7 is a cross-sectional view taken from line 7-7 in FIG. 4B.

The vanes 202 are arranged and rotatable within the inlet cavity 212 to control the effective inlet area. More particularly, the vanes 202 include shafts 214, coupled thereto or formed integrally therewith, which extend axially rearward through the base structure 204 to be coupled to one of the vane levers 208. The shafts 214 may additionally extend axially forward to be received in the forward structure 206. The shafts 214 may extend parallel with the axis 210b of the adjustment ring 210 and further define a pivot axis of the vanes 202 and/or the vane levers 208. As the vanes 202 are pivoted, the area between the vanes 202 that are adjacent each other changes, such that the effective inlet area (e.g., the net total area between the vanes 202 and through which the exhaust gas flows to the turbine wheel 110) changes.

The vane levers 208 are arranged outside the inlet cavity 212 (e.g., rearward of the base structure 204). Each of the vane levers 208 is connected (e.g., rotatably fixed) to one of the vanes 202. As each vane lever 208 is engaged by the adjustment ring 210 outside the inlet cavity 212 to be pivoted (e.g., rotated), the vane 202 connected thereto (e.g., associated therewith) is pivoted (e.g., rotated) inside the inlet cavity 212. The adjustment ring 210 may be rotated relative to the base structure 204 by an actuator 216 (depicted schematically in FIG. 3B), so as to engage and, thereby, pivot the vane levers 208 and, thereby, the vanes 202 between a first position (e.g., shown in FIGS. 3A and 3B) and a second position (e.g., shown in FIGS. 4A-4B).

The adjustment ring 210 may, for example, be a plate- or disk-like structure having a forward surface and a rearward surface that are substantially planar. The adjustment ring 210 may, for example, be a stamped and/or machined member having a thickness of approximately 4 mm or other suitable thickness. The adjustment ring 210 may include an inner periphery 210a (e.g., diameter) in which is received an axially-extending portion 204a of the base structure 204 having a complementary outer periphery. The inner periphery of the adjustment ring 210 and the outer periphery of the axially-extending portion of the base structure 204 may engage each other to control radial location of the adjustment ring 210 to the base structure 204 (e.g., during operation of the turbocharger 100, such as when pivoting the vanes 202). The adjustment ring 210 may be configured to be located and/or rotate relative to the base structure 204 in other suitable manners.

Figure 6A:
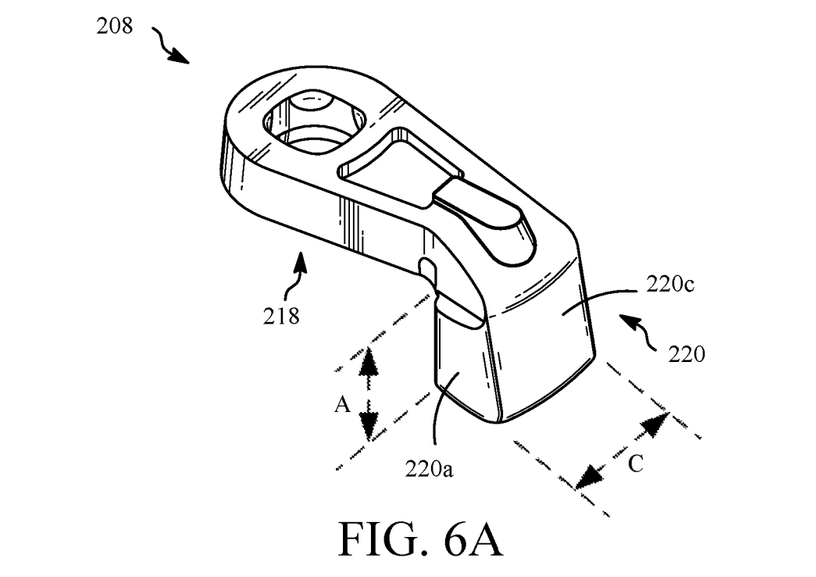
FIG. 6A is a rear perspective view of a vane lever for use in the variable turbine assembly.
Figure 6B:
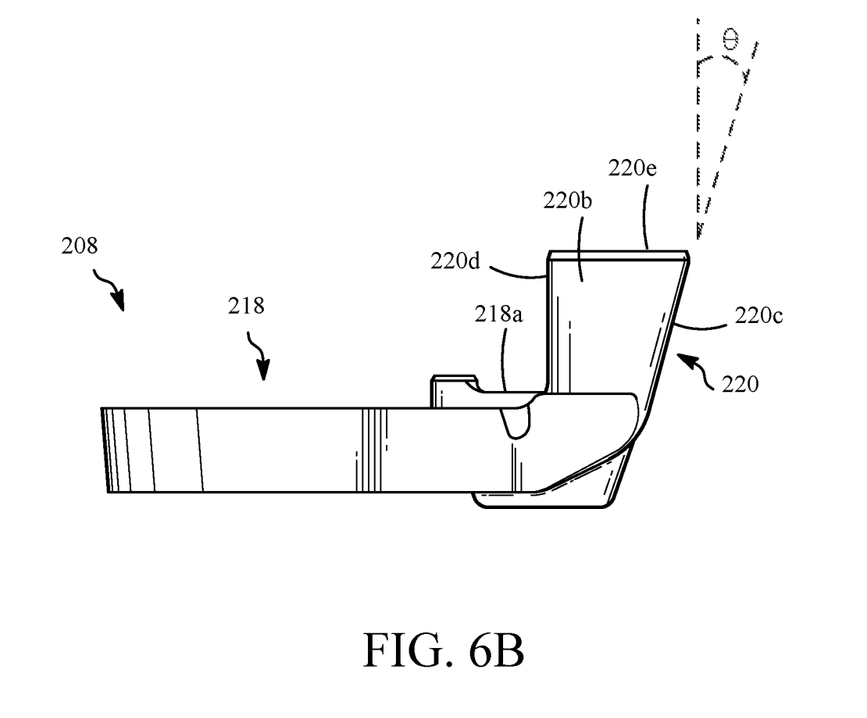
FIG. 6B is a side elevation view of the vane lever of FIG. 6A.

Referring additionally to FIGS. 6A-7, each vane lever 208 is generally L-shaped and includes an inner portion 218 (e.g., a radially inward portion or radially-extending portion) and an outer portion 220 (e.g., a radially outward portion or axially-extending portion). The inner portion 218 extends radially inward from the outer portion 220 relative to an axis 210b of rotation of the adjustment ring 210. The axis 210b may also be referred to as a central axis, and the turbine wheel 110 may be coaxial with the axis 210b. The inner portion 218 is connected to the shaft 214 of the vane 202 associated therewith (e.g., the shaft 214 being received in an aperture of the inner portion 218 of the vane lever 208). The inner portion 218 may extend generally parallel with the adjustment ring 210 (e.g., against a rearward surface thereof).

The outer portion 220 of each vane lever 208 extends axially forward from the inner portion 218 (i.e., toward the exhaust gas outlet 123) and is received in one of several apertures 222 of the adjustment ring 210. As the adjustment ring 210 is rotated, a radially-extending side of each of the apertures 222 engages the outer portion 220 of the vane lever 208 to cause the vane lever 208 and, thereby, the vane 202 connected thereto to pivot about the shaft 214. For example, the outer portion 220 may be considered to include an axial portion, which is that extending into and/or through the aperture 222 associated therewith.

Figure 5:
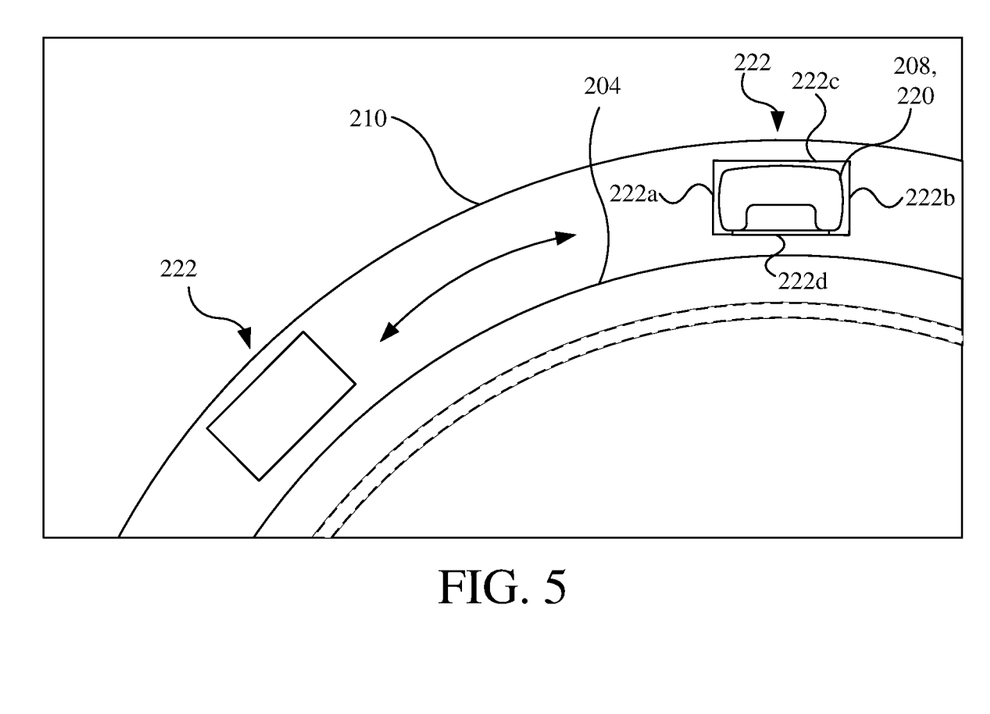
FIG. 5 is a rear, partial schematic view of an adjustment ring and a rear housing structure of the variable geometry turbine assembly of FIG. 2.

Referring additionally to FIG. 5, the apertures 222 of the adjustment ring 210 are spaced circumferentially about the adjustment ring 210 and are provided equal in number to the vane levers 208 and, thereby, equal in number to the vanes 202. Each aperture 222 is defined between a first radially-extending surface 222a, a second radially-extending surface 222b, an outer surface 222c, and an inner circumferential surface 222d. The first radially-extending surface 222a and the second radially-extending surface 222b face each other in a generally tangential direction. As the adjustment ring 210 is rotated, the first radially-extending surface 222a or the second radially-extending surface 222b engages a corresponding surface (discussed in further detail below) of the outer portion 220 of the vane lever 208 within the aperture 222, so as to move (e.g., pivot) the vane lever 208 and, thereby, the vane 202 connected thereto relative to the base structure 204. The outer surface 222c and the inner circumferential surface 222d face each other (i.e., radially inward and radially outward, respectively) and extend circumferentially between the first radially-extending surface 222a and the second radially-extending surface 222b.

As is illustrated in FIGS. 5 and 7, the aperture 222 may have a cross-sectional shape (e.g., in a plane perpendicular to the axis 210b of rotation of the adjustment ring 210) that is rectangular, for example, with the surfaces 222a-222d being straight and intersecting each other at perpendicular angles with filleted transitions therebetween (as shown) or without filleted transitions. Alternatively, the aperture 222 may have a different cross-sectional shape, for example, with one or more of the surfaces 222a-222d being curved in the plane perpendicular to the axis 210b. The cross-sectional shape of the aperture 222 may extend from the forward surface to the rearward surface of the adjustment ring 210, for example, with the surfaces 222a-222d extending parallel with the axis 210b of rotation of the adjustment ring 210. Each of the surfaces 222a-222d may also be referred to as a side or a wall.

Referring to FIGS. 6A-7, the outer portion 220 of each vane lever 208, as referenced above, extends axially forward from the inner portion 218 and includes surfaces that engage the first radially-extending surface 222a and the second radially-extending surface 222b of the adjustment ring 210, which define the aperture 222. More particularly, the outer portion 220 includes a first radially-extending surface 220a, a second radially-extending surface 220b (arranged opposite the first radially-extending surface 220a), and an outer surface 220c extending circumferentially (e.g., tangentially) from the first radially-extending surface 220a to the second radially-extending surface 220b. The outer portion 220 also includes an inner circumferential surface 220d extending tangentially from the first radially-extending surface 220a to the second radially-extending surface 220b. The outer surface 220c may also be referred to as an outer lever surface, a radially-outer surface, or a circumferentially-extending surface.

In planes perpendicular to the axis 210b of rotation of the adjustment ring 210, the surfaces 220a-220d of the outer portion 220 of the vane lever 208 may be straight or may have a curved or irregular cross-sectional shape. For example, as also shown in FIG. 5, the first radially-extending surface 220a, the second radially-extending surface, and the outer surface 220c may be convex (e.g., bowing outward). The inner circumferential surface 220d may, for example, be concave (e.g., having a cutaway that reduced in radial depth moving toward the inner portion 218; see, e.g., FIG. 7).

The outer surface 220c of the outer portion 220 of the vane lever 208 extends non-parallel with the axis 210b of rotation of the adjustment ring 210. For example, the outer surface 220c may taper outward relative to the axis 210b of rotation of the adjustment ring 210 moving axially forward (i.e., up as shown in FIGS. 6B and 7). The radial distance between the outer surface 220c of the outer portion 220 may, thereby, vary (i.e., decrease) moving axially forward. For example, the outer surface 220c of the outer portion 220 and the outer surface 222c forming the aperture 222 of the adjustment ring 210 may be designed to have a nominal radial gap that reduces from a maximum of less than 1 mm (e.g., less than 0.5 mm). Due to manufacturing variability, wear, and operation of the turbocharger 100 or the engine associated therewith (e.g., vibrations), the nominal radial gap may differ from design (e.g., being initially smaller or larger, gradually increasing with wear over time, and/or increasing and decreasing cyclically with vibration inputs). The outer surface 222c may also be referred to as an outer aperture surface, a radially-outer surface, or a circumferential surface.

For example, the outer surface 220c may taper outward moving axially forward at a taper angle $\theta$ that is a non-zero angle relative the axis 210b of rotation of the adjustment ring 210 (e.g., taper angle $\theta$ is less than 20 degrees, less than 15 degrees, less 10 degrees, or less than 5 degrees). The outer surface 220c may extend at the taper angle $\theta$ over a majority of an axial dimension A of the outer portion 220 (e.g., such as greater than 50%, greater than 75%, or greater than 85% of the axial dimension A), the axial dimension A being measured between a first axially-facing surface 220e (e.g., a forward axial surface) of the outer portion 220 and a second axially-facing surface 218a of the inner portion 218 (e.g., another forward axial surface). For example, the taper angle may be a constant angle over the majority (or the entirety) of the axial dimension A. The axial portion of the outer portion 220 may be that portion extending axially from the second axially-facing surface 218a and, thereby, include the outer surface 220c. The taper angle $\theta$ may also be defined with respect to the pivot axis formed by the shaft 214 of the vane 202 coupled to the vane lever 208 (e.g., the pivot axis being parallel to the axis 210b of the adjustment ring 210).

The outer surface 220c may extend at the taper angle $\theta$ at a radially outermost region (e.g., edge) thereof (e.g., the outermost edge as shown in the cross-sectional view of FIG. 7, which may be the furthest from the pivot axis of the vane lever 208). The outer circumferential surface may, instead or additionally, extend at the taper angle $\theta$ over a majority of a circumferential dimension C of the outer portion 220 (e.g., such as greater than 50%, greater than 75%, or greater than 85% of the circumferential dimension C), the circumferential dimension C being measured between the first radially-extending surface 220a and the second radially-extending surface 220b (e.g., such that the outer surface 220c has a constant profile over a majority of the circumferential dimension C). The outer surface 220c may also extend axially non-parallel with the outer surface 222c of the adjustment ring 210, which forms the aperture 222 (e.g., the outer surface 222c extending parallel with the axis 210b).

With the outer surface 220c of the outer portion 220 of the vane levers 208 extending non-parallel with the axis 210b of rotation of the adjustment ring 210, the VTG assembly 200 may experience reduced wear as compared to an otherwise comparable VTG assembly having vane levers with axial portions having outer circumferential surfaces that extend parallel with the axis 210b. For example, the vane levers 208 (e.g., the outer surface 220c of the axial portion) and the adjustment ring 210 (e.g., the outer surface 222c of the apertures 222) may experience reduced wear. Without being held to a particular theory, such reduced wear may be the result of the radial gap between the vane levers 208 and the adjustment ring 210 (i.e., between the outer surfaces 220c, 222c thereof) varying (e.g., reducing) in size moving in the axial direction. As relative axial movement between the vane levers 208 and the adjustment ring 210 occurs during operation (e.g., due to vibrations and/or rattling therebetween), the varied (e.g., reducing) radial gap may result in lower relative velocities and, thereby, lower magnitude impacts between the vane levers 208 and the adjustment ring 210 and/or may result in sliding contact therebetween (e.g., as opposed to impacts in the normal direction). Noise (e.g., rattling) from impacts between the vane levers 207 and the adjustment ring 210 may also be reduced, for example, by varying (e.g., reducing) the radial distance therebetween by reducing relative velocities therebetween and/or by facilitating sliding contact therebetween. Furthermore, binding (e.g., locking up) between the vane levers 208 and the adjustment ring 210 may be prevented, for example, with a reduced surface contact area therebetween from the outer surface 220c of the vane levers 208 extending non-parallel with the axis 210b.

Alternative to the outer surface 220c tapering inward moving axially forward in which case the taper angle $\theta$ is negative. In a still further alternative, the outer surface 220c may, moving axially forward, extend at multiple different angles, for example, being curved in a convex manner (e.g., bowing radially outward), a concave manner (e.g., bowing radially inward), or a complex manner (e.g., inflecting to bow both inward and outward).

The first radially-extending surface 220a and the second radially-extending surface 220b may extend axially forward parallel with the axis 210b of rotation of the adjustment ring 210 or with another profile. The inner circumferential surface 220d may extend axially forward parallel with the axis 210b of rotation of the adjustment ring 210 (e.g., at outer portions thereof) and/or to taper outward (e.g., as shown in the cross-sectional view of FIG. 7).

As a result of the outer surface 220c extending non-parallel with the axis 210b (e.g., tapering inward or outward), an outer periphery and/or a cross-sectional area of the outer portion 220 differs at different positions moving along the axis 210b in the axial direction (e.g., increasing moving axially forward as the outer surface 220c tapers outward). The outer periphery and the cross-sectional area of the outer portion 220 may be considered those formed by all surfaces of the outer portion 220 (e.g., in which case the periphery may be increased and the area decreased for concave surfaces as compared to a straight surface). Alternatively, the outer periphery and the cross-sectional area of the outer portion may be considered those formed by straight and convex surfaces and straight segments extending across concave surfaces (e.g., in which case the periphery may be decreased and the area increased as compared to the concave surface).

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A variable turbine geometry assembly for controlling flow of exhaust gas to a turbine wheel of a turbocharger, the variable turbine geometry assembly comprising:
   a base structure;
   vanes distributed circumferentially around the base structure and pivotable relative to the base structure to vary an effective inlet area;
   vane levers for pivoting the vanes, the vane levers each including an inner portion coupled to one of the vanes and an outer portion extending from the inner portion; and
   an adjustment ring that is selectively rotatable about a central axis to pivot the vanes, the adjustment ring including enclosed apertures that are each associated with and have received therein the outer portion of one of the vane levers;
   wherein the outer portion of each of the vane levers includes an outermost surface that is non-parallel with the central such that the outer portion tapers towards an outer circumferential surface of the aperture receiving the vane lever to reduce wear and/or cause lower-magnitude impacts between the vane levers and the adjustment ring.

2. The variable turbine geometry assembly of claim 1, wherein a cross-sectional area of the outer portion of each of the vane levers received in one of the apertures varies moving parallel with the central axis.

3. The variable turbine geometry assembly of claim 1, wherein the outermost surface of each of the vane levers is tapered relative to the central axis.

4. The variable turbine geometry assembly of claim 1, wherein the outer circumferential surface of each aperture faces radially inward toward the outermost surface of the vane lever received therein.

5. The variable turbine geometry assembly of claim 4, wherein the outer circumferential surface of each of the apertures extends parallel with the central axis.

6. The variable turbine geometry assembly of claim 4, wherein a nominal radial gap is formed between the outer circumferential surface of the aperture and the outermost surface of the vane lever received therein.

7. The variable turbine geometry assembly of claim 4, wherein the apertures each include a first radially-extending surface and a second radially extending surface that extend radially inward from the outer circumferential surface and that engage, respectively, a first radially-extending surface and a second radially-extending surface of the outer portion of the vane lever received therein.

8. The variable turbine geometry assembly of claim 1, wherein the inner portion extends radially relative to the central axis, and the outer portion extends axially relative to the central axis.

9. A variable turbine geometry assembly for controlling flow of exhaust gas to a turbine wheel of a turbocharger, the variable turbine geometry assembly comprising:
   a base structure;
   vanes distributed circumferentially around the base structure and pivotable relative to the base structure to vary an effective inlet area;
   vane levers for pivoting the vanes, the vane levers each including an inner portion coupled to one of the vanes and an outer portion extending from the inner portion; and
   an adjustment ring that is selectively rotatable about a central axis to pivot the vanes, the adjustment ring including apertures that are each associated with and have received therein the outer portion of one of the vane levers;
   wherein the outer portion of each of the vane levers includes an outer surface that is non-parallel with the central axis, wherein the outer surface of each of the vane levers is tapered relative to the central axis, wherein the outer portion of each of the vane levers includes an axial portion that includes the outer surface and that extends axially through the aperture associated therewith, and the outer surface extends at a constant angle over a majority of an axial dimension thereof, the constant angle being a non-zero angle measured relative to the central axis.

10. The variable turbine geometry assembly of claim 9, wherein the base structure is positioned forward of the inner portion of the vane levers, and the outer surface of each of the vane levers is tapered radially outward moving forward.

11. The variable turbine geometry assembly of claim 10, wherein the outer surface of each of the vane levers is tapered at a radially outermost region thereof.

12. The variable turbine geometry assembly of claim 9, wherein the outer surface of each of the vane levers is tapered with a substantially constant profile over a majority of a circumferential dimension thereof.

13. A turbocharger comprising:
    a turbine wheel;
    a turbine housing containing the turbine wheel and having an inlet and an outlet for exhaust gas to flow, respectively, to and from the turbine wheel; and
    a variable turbine geometry assembly comprising:
      a base structure;
      vanes distributed circumferentially around the base structure and pivotable relative to the base structure to vary an effective inlet area for exhaust gas to flow from the inlet to the turbine wheel;
      vane levers for pivoting the vanes, the vane levers each including an inner portion coupled to one of the vanes and an outer portion extending from the inner portion; and
      an adjustment ring that is selectively rotatable about a central axis to pivot the vanes, the adjustment ring including apertures that are each associated with and have received therein the outer portion of one of the vane levers associated therewith, each aperture being defined by an inner surface, an outer surface, and first and second opposing radially surfaces connecting the inner surface and the outer surface;
      wherein the outer portion of each of the vane levers includes an outermost surface that is non-parallel with the central axis such that the outer portion tapers towards the outer surface of the aperture receiving the vane lever to reduce wear and/or cause lower magnitude impacts between the vane levers and the adjustment ring.

14. The turbocharger of claim 13, wherein a cross-sectional area of the outer portion of each of the vane levers received in one of the apertures varies moving parallel with the central axis.

15. The turbocharger of claim 13, wherein the outer surface of each aperture faces radially inward toward the outermost surface of the vane lever received therein.

16. A turbocharger comprising:
a turbine wheel;
a turbine housing containing the turbine wheel and having an inlet and an outlet for exhaust gas to flow, respectively, to and from the turbine wheel; and
a variable turbine geometry assembly comprising:
a base structure;
vanes distributed circumferentially around the base structure and pivotable relative to the base structure to vary an effective inlet area for exhaust gas to flow from the inlet to the turbine wheel;
vane levers for pivoting the vanes, the vane levers each including an inner portion coupled to one of the vanes and an outer portion extending from the inner portion; and
an adjustment ring that is selectively rotatable about a central axis to pivot the vanes, the adjustment ring including apertures that are each associated with and have received therein the outer portion of one of the vane levers associated therewith;
wherein the outer portion of each of the vane levers includes an outer surface that is non-parallel with the central axis, wherein the outer portion of each of the vane levers includes an axial portion that includes the outer surface and that extends axially through the aperture of the adjustment ring associated therewith, and the outer surface is tapered at a constant angle over a majority of an axial dimension thereof, the constant angle being a non-zero angle measured relative to the central axis.

17. The turbocharger of claim 16, wherein the outer surface of each of the vane levers is tapered at a radially outermost region thereof.

18. The turbocharger of claim 17, wherein the outer surface of each of the vane levers is tapered with a substantially constant profile over a majority of a circumferential dimension thereof.

19. A vane lever for a variable turbine geometry assembly for a turbocharger, the vane lever comprising:
an inner portion that is configured to couple to and pivot a vane lever;
an outer portion extending from the inner portion, which is configured to be received in an enclosed aperture of an adjustment ring and engaged by surfaces of the adjustment ring defining the aperture;
wherein the outer portion includes an outermost surface that extends non-parallel to a pivot axis of the vane lever for the outer portion to have a cross-sectional area that differs at different positions along the pivot axis, whereby the outer portion tapers towards an outer surface defining the aperture receiving the vane lever to reduce wear and/or cause lower magnitude impacts between the vane lever and the adjustment ring.

20. The vane lever of claim 19, wherein the inner portion extends radially relative to the pivot axis, and the outer portion includes an axial portion that extends from the inner portion axially and that forms the outermost surface, wherein the outermost surface is tapered relative to the pivot axis at a constant angle that is non-zero.

* * * * *